(12) United States Patent
Yoon

(10) Patent No.: US 9,163,713 B2
(45) Date of Patent: Oct. 20, 2015

(54) CRANK PULLEY DECOUPLING DEVICE

(71) Applicant: Hyundai Motor Company, Seoul (KR)

(72) Inventor: Ki Bong Yoon, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 185 days.

(21) Appl. No.: 14/106,436

(22) Filed: Dec. 13, 2013

(65) Prior Publication Data

US 2015/0072813 A1    Mar. 12, 2015

(30) Foreign Application Priority Data

Sep. 10, 2013 (KR) ........................ 10-2013-0108445

(51) Int. Cl.
*F16D 3/00* (2006.01)
*F16H 55/14* (2006.01)
*F16H 55/36* (2006.01)

(52) U.S. Cl.
CPC .......... *F16H 55/36* (2013.01); *F16H 2055/366* (2013.01)

(58) Field of Classification Search
CPC . F16H 55/36; F16H 2055/366; F16D 41/206; F16D 7/022; F16F 15/123
USPC ......................................................... 474/94
See application file for complete search history.

(56) References Cited

U.S. PATENT DOCUMENTS

| | | | | |
|---|---|---|---|---|
| 306,267 | A * | 10/1884 | La Turno | 464/67.1 |
| 1,518,360 | A * | 12/1924 | Royce | 464/68.41 |
| 3,618,730 | A * | 11/1971 | Mould, III | 192/56.2 |
| 4,139,995 | A * | 2/1979 | Lamarche | 464/64.1 |
| 5,139,463 | A * | 8/1992 | Bytzek et al. | 474/69 |
| 5,156,573 | A * | 10/1992 | Bytzek et al. | 474/74 |
| 5,273,229 | A * | 12/1993 | Komatsu | 242/545.1 |
| 6,044,943 | A * | 4/2000 | Bytzek et al. | 192/41 R |
| 6,083,130 | A * | 7/2000 | Mevissen et al. | 474/70 |
| 6,106,421 | A * | 8/2000 | Graber et al. | 474/94 |
| 6,161,512 | A * | 12/2000 | Beels Van Heemstede | 123/90.31 |
| 6,283,076 | B1 * | 9/2001 | Simpson | 123/90.31 |
| 6,308,678 | B1 * | 10/2001 | Haas et al. | 123/192.1 |
| 6,382,164 | B2 * | 5/2002 | Haas et al. | 123/192.1 |
| 6,394,248 | B1 * | 5/2002 | Monahan et al. | 192/41 S |
| 6,450,137 | B2 * | 9/2002 | Ogawa | 123/90.17 |
| 6,662,769 | B2 * | 12/2003 | Eguchi et al. | 123/90.17 |
| 6,702,681 | B1 * | 3/2004 | Ochs | 464/90 |

(Continued)

FOREIGN PATENT DOCUMENTS

| | | |
|---|---|---|
| KR | 2003-0020698 A | 3/2003 |
| KR | 10-2006-0071805 A | 6/2006 |
| WO | WO 2012/075984 A1 | 6/2012 |

*Primary Examiner* — Henry Liu
(74) *Attorney, Agent, or Firm* — Morgan, Lewis & Bockius LLP

(57) ABSTRACT

A crank pulley decoupling device includes: a crank pulley connected to one end of a crankshaft and configured to transmit a rotational force; a first spring configured to be inserted into the crank pulley and to have one end provided in the crank pulley and the other end provided in the crank shaft; and a second spring configured to be inserted into the crank pulley and to be provided on an outer circumferential surface of the crankshaft. Spring design and design change are freely done by utilizing space in the crank pulley while the first and second springs are spaced apart so that impact therebetween is reduced, thereby improving durability and preventing decrease in efficiency due to friction and thus improving the product value.

5 Claims, 5 Drawing Sheets

(56) References Cited

U.S. PATENT DOCUMENTS

| | | | |
|---|---|---|---|
| 7,137,362 B1* | 11/2006 | Settineri | 123/41.12 |
| 7,591,357 B2* | 9/2009 | Antchak et al. | 192/55.5 |
| 7,618,337 B2* | 11/2009 | Jansen et al. | 474/74 |
| 7,624,852 B2* | 12/2009 | Mevissen et al. | 192/41 S |
| 7,954,613 B2* | 6/2011 | Mevissen et al. | 192/41 S |
| 7,998,008 B2* | 8/2011 | Kamdem et al. | 474/94 |
| 8,177,669 B2* | 5/2012 | Ishida et al. | 474/94 |
| 8,262,520 B2* | 9/2012 | Shimamura et al. | 474/94 |
| 8,302,753 B2* | 11/2012 | Antchak et al. | 192/55.5 |
| 8,317,642 B2* | 11/2012 | Hartmann et al. | 474/94 |
| 8,506,434 B2* | 8/2013 | Harvey | 474/94 |
| 8,602,928 B2* | 12/2013 | Serkh et al. | 474/70 |
| 8,632,431 B2* | 1/2014 | Pflug et al. | 474/94 |
| 8,641,563 B2* | 2/2014 | Mende et al. | 474/94 |
| 8,677,849 B2* | 3/2014 | Simpson | 74/440 |
| 8,678,157 B2* | 3/2014 | Ward et al. | 192/55.1 |
| 8,789,670 B2* | 7/2014 | Antchak et al. | 192/41 S |
| 8,813,928 B2* | 8/2014 | Schneider et al. | 192/41 S |
| 8,863,925 B2* | 10/2014 | Antchak et al. | 192/41 S |
| 2006/0144664 A1* | 7/2006 | Antchak et al. | 192/41 S |
| 2007/0021250 A1* | 1/2007 | Spintzyk | 474/94 |
| 2007/0037644 A1* | 2/2007 | Mevissen et al. | 474/70 |
| 2007/0066426 A1* | 3/2007 | Kamdem et al. | 474/94 |
| 2008/0139351 A1* | 6/2008 | Pflug et al. | 474/94 |
| 2008/0207364 A1* | 8/2008 | Schebitz et al. | 474/94 |
| 2008/0312014 A1* | 12/2008 | Stief et al. | 474/94 |
| 2008/0312015 A1* | 12/2008 | Schebitz et al. | 474/94 |
| 2009/0005201 A1* | 1/2009 | Shimamura et al. | 474/94 |
| 2010/0167856 A1* | 7/2010 | Hartmann et al. | 474/94 |
| 2011/0065537 A1* | 3/2011 | Serkh et al. | 474/94 |
| 2011/0224038 A1* | 9/2011 | Aantchak et al. | 474/94 |
| 2011/0245000 A1* | 10/2011 | Serkh et al. | 474/94 |
| 2011/0263365 A1* | 10/2011 | Mende et al. | 474/94 |
| 2012/0015768 A1* | 1/2012 | Serkh et al. | 474/94 |
| 2012/0088616 A1* | 4/2012 | Ali et al. | 474/94 |
| 2013/0062155 A1* | 3/2013 | Varin et al. | 192/41 S |
| 2013/0150191 A1* | 6/2013 | Ishida | 474/94 |
| 2013/0217524 A1* | 8/2013 | Antchak et al. | 474/94 |
| 2013/0284139 A1* | 10/2013 | Staley | 123/179.25 |
| 2013/0324335 A1* | 12/2013 | Chen et al. | 474/94 |

* cited by examiner

CRANK PULLEY DECOUPLING DEVICE

CROSS-REFERENCE TO RELATED APPLICATION

The present application claims priority of Korean Patent Application Number 10-2013-0108445 filed Sep. 10, 2013, the entire contents of which application is incorporated herein for all purposes by this reference.

BACKGROUND OF INVENTION

1. Field of Invention

The present invention relates to a crank pulley decoupling device, and more particularly, to a crank pulley decoupling device capable of utilizing space in the crank pulley and reducing impact between springs.

2. Description of Related Art

In general, a crank is connected to an engine crank shaft by a crank pulley and is driven by a rotational force from an engine transmitted by a belt. The belt transmits the force by friction between the belt and the belt pulley. The types of belt include a flat belt having a flat contact surface and a V belt having a V-shaped contact surface to increase friction coefficient and improve transmission efficiency.

Incidentally, a crank pulley is located under the center of an engine, a water pump pulley is located above the crank pulley, an alternator pulley and an air pump pulley are located upper left and lower left sides of the water pump pulley, respectively, and an air conditioner pump pulley and a power steering pump pulley are located upper right and lower right sides of the water pump pulley. All of the pulleys are designed to receive a rotational force from the crank pulley by one belt.

The crank pulley is fitted into and fixed to the crankshaft together with a timing belt sprocket.

The devices that receive a driving force from the crank pulley of the engine as it is driven, such as an alternator, an air conditioner compressor, and a water pump are collectively referred to as a serpentine belt system. In this system, the crank pulley has an instantaneous speed change due to the intake, compression, power and exhaust strokes in an internal combustion engine with a piston.

To overcome this problem, a crank pulley decoupling device to reduce a tension of the serpentine belt system by reducing an instantaneous speed change of the crank pulley is being developed.

Since a typical crank pulley decoupling device uses one spring, it is difficult to cope with an instantaneous speed change in all of the area while an engine is operating. Accordingly, a two-stage crank pulley decoupling device has been developed, which uses two springs, as shown in FIG. 1.

The two-stage crank pulley decoupling device shown in FIG. 1, however, has the structure in which a first arc spring 11 having a larger diameter includes a second arc spring 12 having a smaller diameter and being long, so that it is limited to design and change the second arc spring 12 due to the space of the crank pulley when an engine starts. Further, friction occurs between springs and thus efficiency and durability are deteriorated.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, various aspects of the present invention have been made to address the above-mentioned problems occurring in the prior art while advantages achieved by the prior art are maintained intact.

Various aspects of the present invention provide for a crank pulley decoupling device capable of utilizing space in the crank pulley and reducing impacts between springs.

In various aspects of the present invention, there is provided a crank pulley decoupling device, including: a crank pulley connected to one end of a crankshaft and configured to transmit a rotational force; a first spring configured to be inserted into the crank pulley and to have one end provided in the crank pulley and the other end provided in the crank shaft; and a second spring configured to be inserted into the crank pulley and to be provided on an outer circumferential surface of the crankshaft.

The first spring may be a torsion spring and the second spring may be an arc spring.

The first spring may be mounted in the shaft direction of the crankshaft and the second spring may be mounted in the circumferential direction of the crankshaft.

The first spring and the second spring may be spaced apart from each other.

The crank pulley may have an enlarged inner diameter of an opening through which the crankshaft is inserted so as to receive the second spring.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
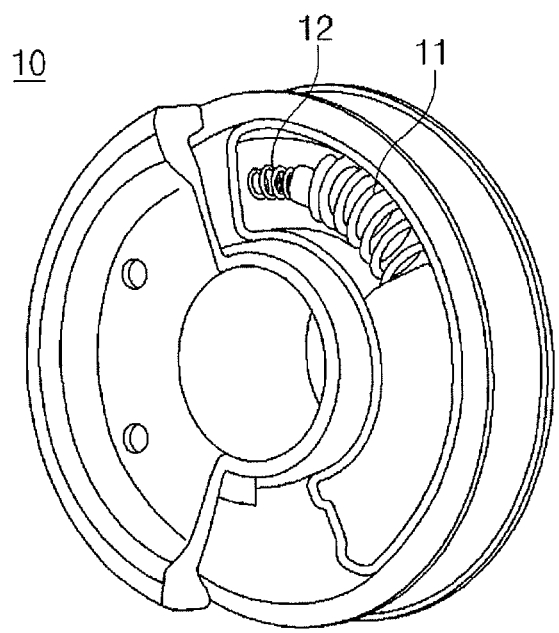
FIG. 1 is a view of a crank pulley decoupling device according to the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 2 to 5, a crank pulley decoupling device according to the present invention includes a crank pulley 10 into which one end of a crank shaft 20 is inserted, a first spring 100 having one end provided in the crank pulley 10 and the other end provided in the crank shaft 20, and a second spring 200 provided along the outer circumferential surface of the crankshaft 20.

Figure 2:
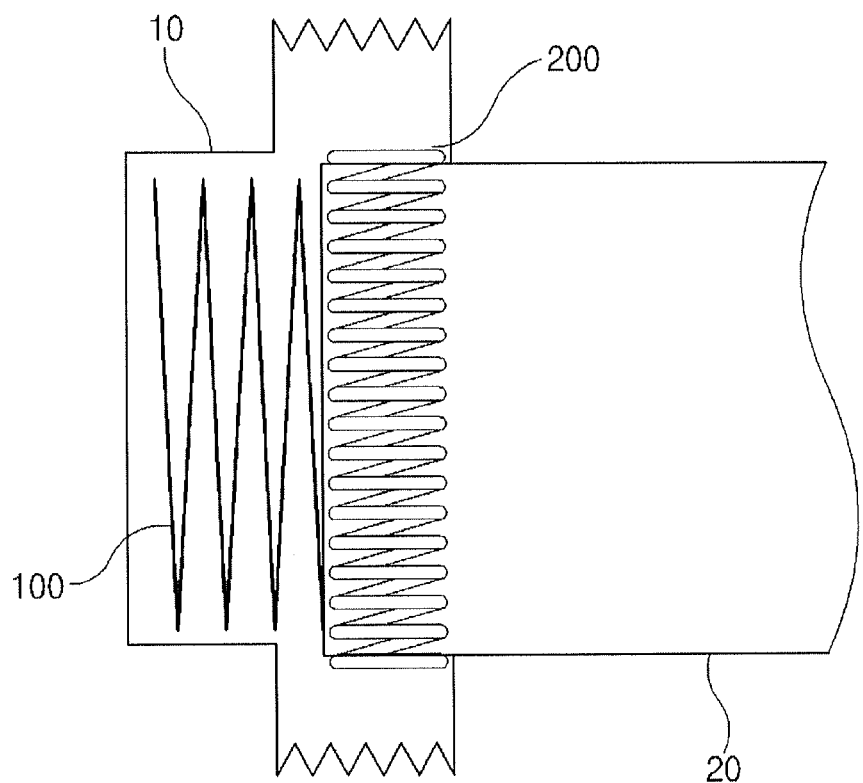
FIG. 2 is a cross-sectional view of an exemplary crank pulley decoupling device according to the present invention.
Figure 3:
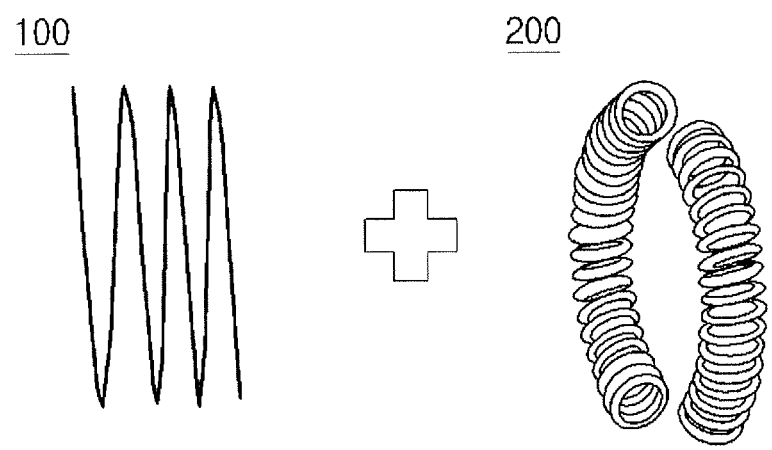
FIG. 3 is a view of the first and second springs in the exemplary crank pulley device according to the present invention.
Figure 4:
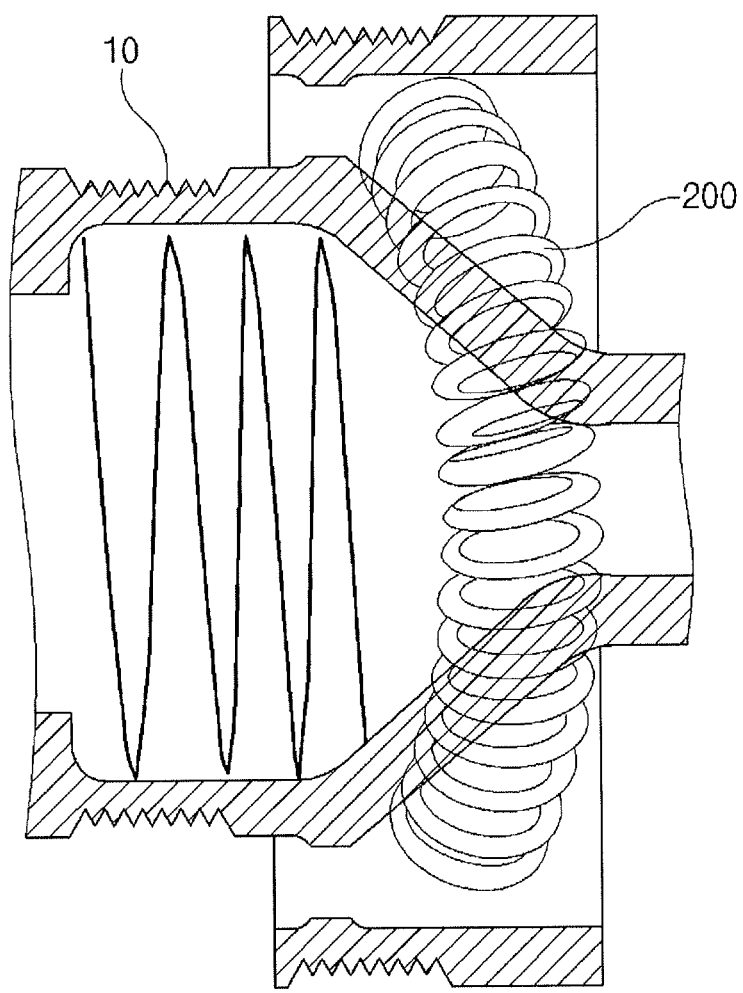
FIG. 4 is a view of an exemplary crank pulley decoupling device according to the present invention.

As shown in FIGS. 2 to 4, the crank pulley 10 into which one end of the crankshaft 20 is inserted transmits a rotational force.

The crank pulley 10 and the crankshaft 20 are already described in the Field of the invention and thus the description thereon will not be repeated again.

However, the crank pulley 10 according to the present invention is different in that it has space therein to accommodate first and second springs 100 and 200 to be described.

The first spring 100 is inserted in the crank pulley 10 with one end provided in the crank pulley 10 and the other end provided in the crank shaft 20 inserted into the crank pulley 10. By doing so, the first spring 100 serves to reduce an instantaneous speed change of the crank pulley 10 when an engine starts using the spring force, thereby reducing the tension of a belt located at the outside of the crank pulley 10.

The second spring 200 is inserted in the crank pulley 10 while being located along the outer circumferential surface of the crank shaft 20 inserted into the crank pulley 10. By doing so, like the first spring 100, the second spring 200 serves to reduce an instantaneous speed change of the crank pulley 10 when the engine starts using the spring force, thereby reducing the tension of the belt located at the outside of the crank pulley 10.

The first spring 100 may include a torsion spring which may be compressed and stretched back and forth, and the second spring 200 may include an arc spring.

The first spring 100, which is a torsion spring, is mounted along the axial direction or shaft direction of the crankshaft 20 so as to connect the crank pulley 10 to the crankshaft 20, and the second spring 200, which is an arc spring, is mounted in the circumferential direction of the crankshaft 20 so as to be located on the outer circumferential surface of the crankshaft 20.

As described above, since the first spring 100 is provided in the crank pulley 10 in the shaft direction whereas the second spring 200 is located on the outer circumferential surface of the crank shaft 20, they are spaced apart. Therefore, even when the engine starts, the first and second springs 100 and 200 do not make contact with each other and thus problems of friction between the springs do not occur, thereby improving durability.

The crank pulley 10 has an enlarged inner diameter of an opening through which the crankshaft 20 is inserted, so as to the second spring 200 may be inserted therein. The first spring 100 and the second spring 200 may remain spaced apart even after the second spring 200 is inserted.

Figure 5:
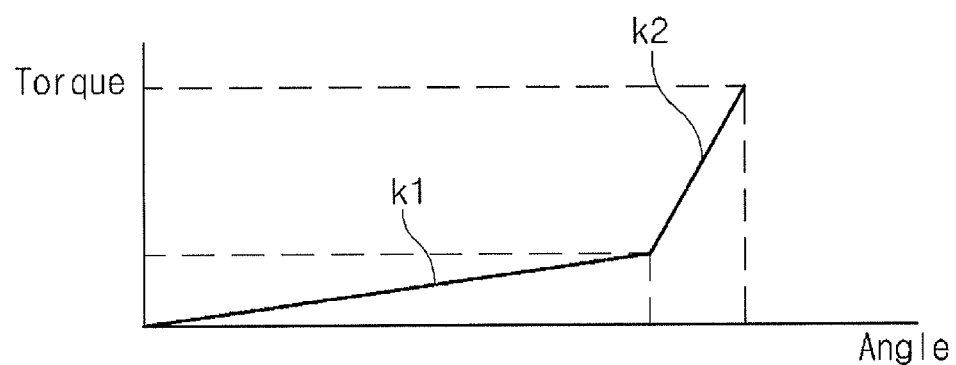
FIG. 5 is a graph showing the spring force according to the torque of the exemplary crank pulley decoupling device according to the present invention.

As shown in FIGS. 2 and 5, according to the present invention, one end of the first spring 100 is provided in the crank pulley 10 and the other end is provided in the crankshaft 20 inserted into the crank pulley 10. Accordingly, when the crank pulley 10 operates with a low torque when the engine starts, the first spring 100 performs decoupling according to the value of k1 of the first spring 100. At this time, although the angle (torsion amount) becomes larger, the effect of decoupling is improved.

The second spring 200 is inserted in the crank pulley 10 while being located on the outer circumferential surface of the crank shaft 20 inserted into the crank pulley 10. Accordingly, when the crank pulley 10 operates with a high torque when the engine starts, the second spring 200 performs decoupling according to the value of k2 of the second spring 200. At this time, although the effect of decoupling becomes smaller than that obtained by k1 of the first spring 100, the angle (torsion amount) becomes smaller.

That is to say, according to the present invention, the first spring 100 operates in the shaft direction of the crankshaft 20 with a low torque when the engine starts, whereas the second spring 200 operates in the circumferential direction of the crankshaft 20 with a high torque when the engine starts, so that the effects of the torsion and decoupling are maximized according to the magnitude of the torque while the first and second springs 100 and 200 remain being spaced apart. Therefore, durability can be improved and deterioration in efficiency due to friction can be prevented, thereby improving the product value.

As set forth above, according to the present invention, spring design and design change are freely done by utilizing space in the crank pulley while the first and second springs are spaced apart so that impact therebetween is reduced, thereby improving durability and preventing decrease in efficiency due to friction and thus improving the product value.

For convenience in explanation and accurate definition in the appended claims, the terms upper or lower, left or right, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A crank pulley decoupling device, comprising:
a crank pulley connected to one end of a crankshaft and configured to transmit a rotational force;
a first spring inserted into the crank pulley and to have one end disposed in the crank pulley and an opposing end disposed in the crank shaft; and
a second spring inserted into the crank pulley and disposed on an outer circumferential surface of the crankshaft.

2. The crank pulley decoupling device according to claim 1, wherein the first spring is a torsion spring and the second spring is an arc spring.

3. The crank pulley decoupling device according to claim 1, wherein the first spring is mounted in an axial direction of the crankshaft and the second spring is mounted in a circumferential direction of the crankshaft.

4. The crank pulley decoupling device according to claim 1, wherein the first spring and the second spring are spaced apart from each other.

5. The crank pulley decoupling device according to claim 1, wherein the crank pulley has an enlarged inner diameter of an opening through which the crankshaft is inserted to receive the second spring.

* * * * *